NATHANIEL JENKINS, OF BOSTON, MASSACHUSETTS.

*Letters Patent No. 83,637, dated November 3, 1868.*

IMPROVED COMPOSITION FOR THE SOLES AND HEELS OF BOOTS AND SHOES.

The Schedule referred to in these Letters Patent and making part of the same.

*To all to whom these presents shall come:*

Be it known that I, NATHANIEL JENKINS, of Boston, in the county of Suffolk, and State of Massachusetts, have made an invention of a new and useful Manufacture of a Composite Material for the Soles and Heels of Boots and Shoes, as well as for various other purposes; and do hereby declare the following to be a full, clear, and exact description of the nature, use, and advantages of my invention.

This invention has for its principal object, economizing the production of a material for the heels of boots and for other purposes, which, while being semi-elastic in its nature, shall have durable wearing-qualities, the said invention consisting mainly in the combination of caoutchouc and raw hide, minor conditions of the invention being the addition to such compound of materials for changing the color, or increasing the specific gravity thereof, the whole being as hereinafter explained.

The use of caoutchouc, or India rubber, is now very general for the soles and heels of boots and shoes, but is objected to in many instances on account of its cost as compared with other materials, as well as want of lasting wearing-qualities.

By the employment of my invention, I am enabled to reduce the expense of the material for the above-mentioned purposes, by combining with caoutchouc or rubber a material, which, while being much cheaper, adds vastly to the tenacity and wearing-qualities of such caoutchouc or rubber.

In carrying out my present invention, I take caoutchouc in sheets or slices, and spread thereon raw hide, reduced to as finely a powdered state as is practicable, and roll into or thoroughly incorporate such raw hide with the caoutchouc, the proportion being about two-fifths of gum to three-fifths of raw hide.

For the purpose of changing the color, or of reducing the cost of the combined caoutchouc and hide, by adding to its specific gravity, without injury to it in other respects, I have contemplated adding to it either one or more of the following ingredients, that is, Paris white, lamp-black, plumbago, or French chalk, in a powdered state.

Should either or all of these be employed, the powder is to be mixed with the raw hide, and incorporated with the caoutchouc, as before mentioned.

Substances, other than the four above mentioned, may, however, be employed for effecting substantially equivalent results, without varying the characteristic feature of my invention.

I would remark, that for the sake of economy in several respects, I have not contemplated subjecting the above-mentioned compound to the ordinary vulcanizing-process.

It will be evident that this may be done, should practice demonstrate it to be essential or desirable.

I claim as my invention, and desire to secure by Letters Patent of the United States—

1. A combination of caoutchouc, or India rubber, and raw hide, in suitable proportions, for the purposes before explained.

2. The addition, to a compound of caoutchouc and raw hide, of a less expensive and heavier substance or substances, to produce results before described.

NATH'L JENKINS.

Witnesses:
FRED. CURTIS,
EDWARD GRIFFITH.